US008793654B2

(12) United States Patent
Schatz

(10) Patent No.: US 8,793,654 B2
(45) Date of Patent: Jul. 29, 2014

(54) METHOD AND A SYSTEM FOR GENERATING A SOFTWARE PRODUCT

(76) Inventor: Walter Schatz, Hohenkirchen-Siegertsbrunn (DE)

( * ) Notice: Subject to any disclaimer, the term of this patent is extended or adjusted under 35 U.S.C. 154(b) by 168 days.

(21) Appl. No.: 13/422,604

(22) Filed: Mar. 16, 2012

(65) Prior Publication Data
US 2012/0246618 A1 Sep. 27, 2012

(30) Foreign Application Priority Data
Mar. 24, 2011 (EP) .................................. 11159684

(51) Int. Cl.
G06F 9/44 (2006.01)
(52) U.S. Cl.
USPC .......................................................... 717/122
(58) Field of Classification Search
None
See application file for complete search history.

(56) References Cited

U.S. PATENT DOCUMENTS

| 7,765,520 | B2 * | 7/2010 | Wagner et al. | 717/101 |
|---|---|---|---|---|
| 2003/0005093 | A1 * | 1/2003 | Deboer et al. | 709/220 |
| 2005/0262488 | A1 * | 11/2005 | Wagner et al. | 717/144 |
| 2009/0119638 | A1 * | 5/2009 | Li et al. | 717/101 |
| 2009/0210855 | A1 * | 8/2009 | Ramanathan | 717/102 |
| 2010/0242022 | A1 * | 9/2010 | Wagner et al. | 717/123 |
| 2013/0254755 | A1 * | 9/2013 | Yousouf et al. | 717/170 |
| 2013/0254757 | A1 * | 9/2013 | Yousouf et al. | 717/174 |

OTHER PUBLICATIONS

Wikipedia: "Integrated development environment", en.wikipedia.org, Feb. 5, 2011, pp. 1-3, XP55001955, Retrieved from the Internet: URL:http://en.wikipedia.org/w/index.php?title=Integrated_development_environment&oldid=412082184 [retrieved on Jul. 5, 2011].
European Search Report for corresponding European Application No. 11 159 684.7, dated Jul. 20, 2011.

* cited by examiner

Primary Examiner — Philip Wang
(74) Attorney, Agent, or Firm — Myers Wolin, LLC

(57) ABSTRACT

A computer-implemented method executed by a server processor for generating a software product comprises generating modules, each module being described by module metadata, and for each generated module, adding dependencies on other modules to the module metadata, creating a nest, the nest comprising data describing a development environment of a client processor for the module, and adding the nest to the module metadata, and further comprising storing the module metadata with a database connected to the server processor, providing a created nest to the client processor for being loaded into the development environment of the client processor, and building the module and publishing the built module to a publication repository connected to the server processor. Furthermore, there is provided a system for generating a software product and being adapted for performing the computer-implemented method.

13 Claims, 3 Drawing Sheets

METHOD AND A SYSTEM FOR GENERATING A SOFTWARE PRODUCT

CROSS REFERENCE TO RELATED APPLICATIONS

Figure 1:
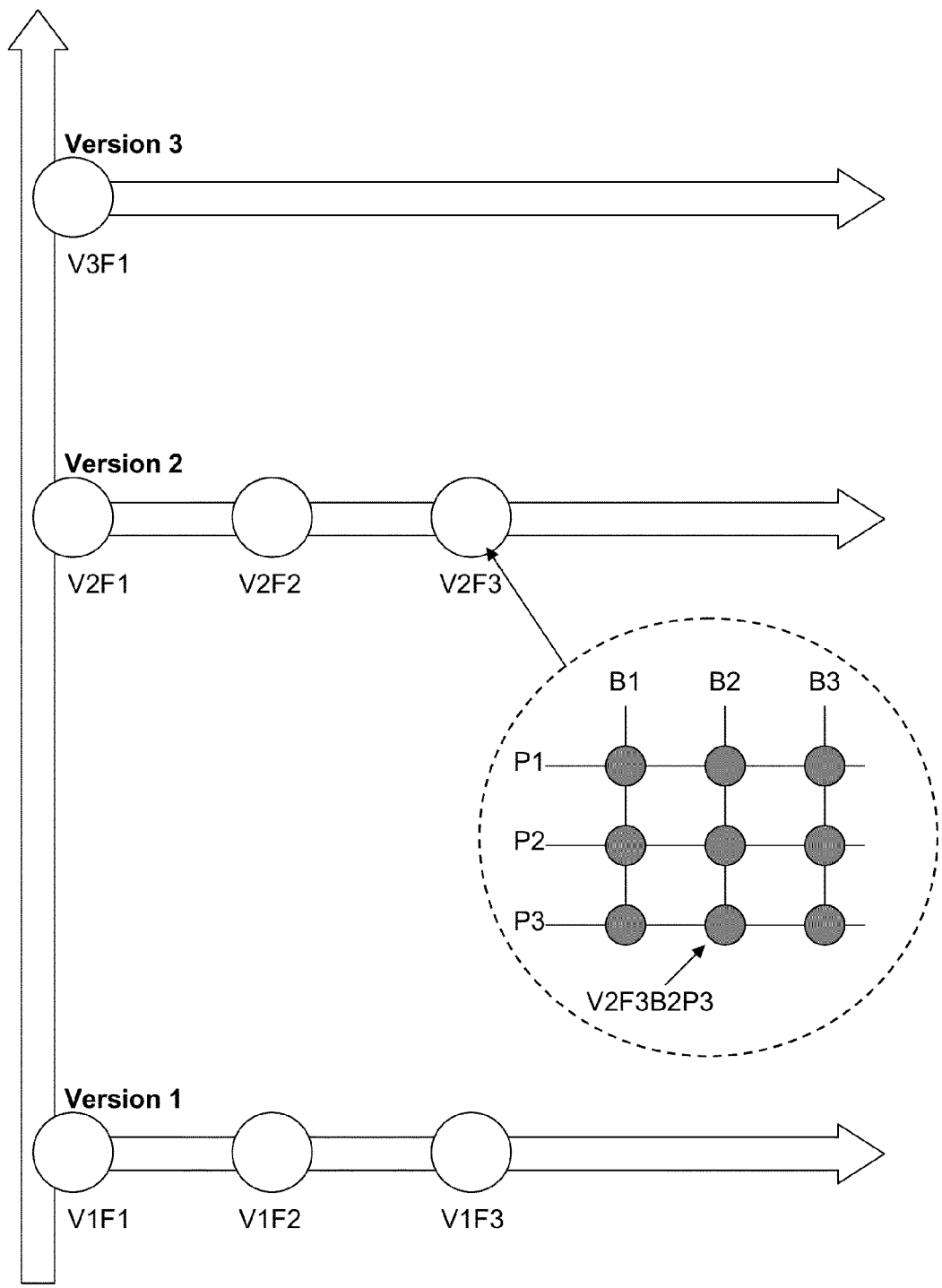

The present application claims priority to European Patent Application No. 11 159 684.7, filed on Mar. 24, 2001, the contents of which are hereby incorporated by reference.

FIELD OF THE INVENTION

The invention relates to a method and a system for generating a software product.

STATE OF THE ART

Software programming involves the creation and processing of a number of files of different types. The primary files are:
  source files, created with a text editor,
  object files, created by compiling the source files,
  static library files, created by linking the object files,
  dynamic libraries and executables, created by linking static libraries and/or object files.

Beside those, there are also auxiliary files, which are tool specific, such as project files, solution files, index files, symbol database files.

The known way to manage these files is creating a directory structure. The files may be grouped by type and purpose of the files. Source files are the most important, because they are the direct result of the programmer's work. The rest of the primary files are created by processing the source files.

Modern programming is done usually by using an IDE (integrated development environment), a tool which offers all the functionality needed by programmers in a single environment. Modern IDEs use as high level work unit the term "project", which is basically a structure of directories and files together with metadata for controlling the different programming tools. The build process (mainly compiling and linking) is also controlled inside the projects by the IDE.

Most IDEs offer also a higher level work unit, called solution or workspace, which groups together a number of projects. This level manages the dependencies between the projects and the build process of the projects.

Very seldom a source file contains everything it needs in order to be compiled. Usually source files use elements declared in other files and nearly all programming languages offer a way to import declarations from one file into another. This leads to dependencies between files. As a result, a file has to be recompiled whenever a file it depends on has been changed.

These dependencies form together a graph and in usual software products this graph is very complex. The dependency graph on source code level is a low level graph. There is also a higher level graph, between projects, and this is managed by the IDE. Using this graph the IDE makes sure the projects are build in the correct order.

A software product is developed incrementally, usually by team of software developers. Functionality is constantly added, existing code is changed, extended, improved and corrected. If the software is developed by a team of programmers, each member may use its own computer and work environment. Sharing the code and making the changes available to all members, means putting the code in a version control system, which usually stores the files in a central repository. Every team member needs a local copy of the code in its own work environment.

Every time a file is stored in the version control system, it gets a revision identifier, so the revision chain can be parsed and different revisions can be compared. A user can also assign an abstract tag name to different revisions of different files, so a certain state of each file can be recovered later from the version control system. This is used at release time, when the software product is delivered. One local copy is updated, so it contains the same state as the central copy, the software product is built and all the files in the repository are labeled with a release specific tag. Later, whenever needed, the state of the local copy at release time can be retrieved from the repository using this specific tag.

Managing different versions of a product involves branching. The version control systems support the notion of "branch", so the files can have different parallel versions. Working on a branch means making a local copy of the files from that branch. Update, check-in and check-out work with the revisions marked as belonging to that branch. Copying changes from one branch to another is done by merging.

The incremental development of code and the very complex dependency graph on source code level lead to huge structures of files and directories containing the product of the programming work. Software products having hundred of thousands of source files, containing millions of lines of code and needing many GB of storage space are very common. The programmers need to have all source files in their local copy and compile most or all of them, even when their current task involves only few files.

Making a change in a file from the local copy of this structure can force the recompilation of any number of files and this can be very time consuming. Every programmer updating from the repository, in order to have the changes other team member performed, needs to recompile a large part of the project structure, if not all of it, again very time consuming.

It might happen that the local copy can be compiled, but updating from the repository results in a new version which is no longer compilable—correcting the errors introduced this way is also a time consuming operation.

Another type of problem, and therefore a supplementary effort, may be generated by the independent check-in of different team members. In this case each local copy may be compiled correctly, while performing check-in from more than one local copy can lead to a repository containing a new version which is not identical to any of the local copies, and which, in some cases, can no longer be compiled.

To minimize the impact of such errors some teams use nightly builds. They check if the current version from the repository builds correctly. This process involves making a local copy of the whole project file structure and building it all, every time, so the operation is usually done at night when the programmers do not check-in. The process is time consuming and the errors are detected only once a day.

Besides oversized storage space and time consuming operations, having a huge file structure containing the source code with a very complex dependency graph has two more drawbacks:
  low reusability, and
  poor access protection.

First, it is hard to reuse code in two or more products which have their own, independent file structure. Second, it can happen that a team member works on a product without having the permission to see the entire source code. An example of such a situation is when the company decides to outsource some work without giving access to all of the source code.

In both cases the development team needs to isolate some part of code and extract it in a separate file structure. Depending on the position of this code in the general dependency graph, this operation can be everything from very easy to very hard.

Consider a software product with a huge file structure composed, from IDE's point of view, of many projects, having a very complex dependency graph on source level and a less complex dependency graph on project level.

Problems with this structure are:
- low efficiency because of time consuming operations involving the huge file structure (mainly build), continuous integration becomes hard and inefficient,
- low reusability of the code in different products with independent file structures,
- low protection—programmers need access to the entire source code in order to work, even if their work involves only a small part of the code, so outsourcing of small parts of code while keeping the rest protected and inaccessible is hard and inefficient.

It is obvious that a changed approach of managing the files of a software product is not allowed to change the functionality of the product. Since the functionality of the product is determined by the content of the files and their dependency graph, the approach is not allowed to change them, at least not in a way that would change the functionality. The only changes allowed would be the ones derived from a changed file structure (like changes path of includes, changes CLASSPATH and so on).

Object of the Invention

The object of the invention is therefore to provide a method and a system for generating software products which overcome at least partially the mentioned problems known from the state of the art.

Solution According to the Invention

This object is achieved according to the invention with a method and a system for generating a software product according to the independent claims.

According to them, a computer-implemented method for generating a software product is provided, the method comprising at least one of the following steps, the steps being executed by a server processor:
- generating a number of modules for the software product to be generated, each module being described by module metadata;
- for each generated module
  - adding dependencies on other modules to the module metadata;
  - creating a nest, the nest comprising data describing a development environment of a client processor for the module;
  - adding the nest to the module metadata;
- storing the module metadata with a database operatively connected to the server processor;
- providing at least one created nest to the client processor for being loaded into the development environment of the client processor; and
- building the module and publishing the built module to a publication repository operatively connected to the server processor.

Thus, with the method according to the invention
- the software programming will be centered around small pieces of code, called "modules";
- modules will be developed in a small environment called "nest"; (Usually this is an IDE project, but since "project" is a pretty overloaded term in software development the term nest will be preferred for this model. Another reason for preferring this term is that this model can be used also in programming environments without an IDE, like traditional make-files and stand-alone text editors);
- the build product of the module is called "publication";
- publications can have various "presentation forms", like "Debug" or "Release"; and/or
- modules will access their dependencies only in their publicated form, not direct in the nest.

Further, with the inventive method
- the huge, "monolithic" file structure of a software product will be dropped;
- each module will have a quasi-independent life; and/or
- the notion of solution or workspace, as used by the IDE, will be dropped. Of course solutions and workspaces can be used during coding, but they will not have a role in this model, so the dependencies between projects will not be managed by them.

The build product of most modules will be a form of libraries, so the modules depending on them can use the libraries to compile and link. The top level ones will be the deliverable products, like executables or installation packages.

Yet further, the inventive method provides the following benefits:
- since the programming work is centered around the nest, which is small compared to the traditional file structure, the storage space and the compile time during daily work are much reduced. Of course, the programmer will need to have around more than one nest, but he will need only the nests he really works on;
- since the dependencies are used in their compiled form, as libraries, it is easier to share them between teams or products; and/or
- also, team members which are not allowed to see the source code of certain modules will develop only in a controlled environment, the nest of the modules they work on, and the rest of the code is presented to them in compiled form. This way outsourcing without giving access to the entire code is easier.

Furthermore
- the inventive method splits the original file structure of a software product in small, quasi-independent modules. Of course, the original, very complex dependency graph on source level still exists, it is just less visible because the whole code is usually not present.
- the development style shifts from developing a huge, monolithic product to developing small libraries.
- modules may be developed as small libraries, with independent work environments and independent development life. The traditional project dependencies, managed by the IDEs, have not to be used.
- binary compatibility (a library is binary compatible, if a program linked dynamically to a former version of the library continues running with newer versions of the library without the need to recompile) can be ensured without the necessity of a total rebuild of the projects in the solution (or workspace).
- usual IDEs may be used for programming. The required extensions for managing the versions of the modules and ensuring the binary compatibility may be provided for example by plug-ins for the IDE.

Each module may comprise at least source code, wherein the method further comprises a step of storing the source code with a version control repository operatively connected to the server processor.

The method may further comprise at least one of the following steps:
  building a new version of a module and publishing the new version of the module to the publication repository;
  building a new fixed version of a specific version of a module and publishing the new fixed version to the publication repository;
  building a new presentation version of a specific version of a module or a specific fixed version of a module and publishing the new presentation version to the publication repository; and/or
  building a new build version of a specific version of a module or a specific fixed version of a module and publishing the new build version to the publication repository.

The method may further comprise a step of signaling the nest loaded into the development environment of the client processor a new version of a module, a new fixed version of a specific version of a module, a new presentation version of a specific version of a module or a specific fixed version of a module, and/or a new build version of a specific version of a module or a specific fixed version of a module.

The server processor may instruct the nest loaded into the development environment of the client processor to update the dependencies of the module and/or to load the new versions of the dependent modules into the nest.

The method may further comprise providing an acceptance process for each module to build.

The dependencies on other modules may be derived from a structured document provided to the server processor.

Further, a system for generating a software product is provided, the system comprising
  a database for storing module metadata describing modules for the software product to be generated;
  a server processor operatively connected to the database and operatively connectable to a client processor, the client processor being adapted to perform a method according to one of the previous claims and to provide at least one nest to the client processor for being loaded into the development environment of the client processor, the at least one nest comprising data describing a development environment for a module
  a publication repository operatively connected to the server processor for storing built modules and for providing built modules to the client processor; and
  a version control system operatively connected to the server processor for storing source code of the modules and for providing source code of the modules to the client processor.

The system may further comprise a build system operatively connected to the server processor, to the version control system and to the publication repository for generating build modules, publishing the built modules with the publication repository and storing the source code of the modules with the version control system.

The server processor may comprise a software program, the software program being adapted for processing requests from the client processor.

The software program may be adapted for providing an interface between the client processor, the database, the publication repository, and the version control system.

The server processor may be adapted for controlling the build system for building the publications.

The server processor may be adapted for determining the dependencies of a module for the software product to be generated and for signaling the client processor about a new or changed dependencies.

Furthermore, a computer-readable storage medium is provided, comprising program code for performing the method according to the invention, when loaded into a computer system.

Further benefits and advantageous embodiments of the invention result from the description, the drawing, and the claims.

SHORT DESCRIPTION OF THE FIGURES

Figure 2:
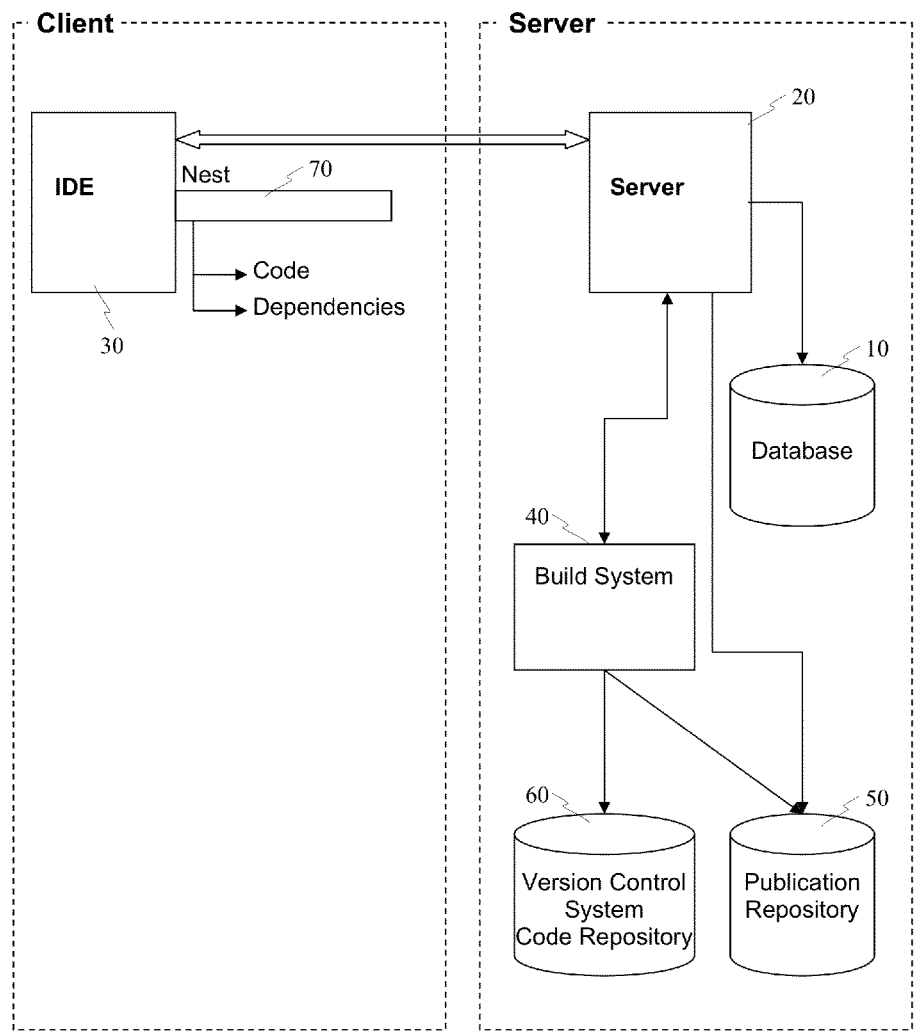

In the drawing, embodiments are illustrated in a schematically simplified way and are explained more in detail in the following description. The drawing show:
  FIG. 1 an example of a publication of a module;
  FIG. 2 a system for developing software according to the invention; and
  FIG. 3 a flowchart of an embodiment of the inventive method.

DETAILED DESCRIPTION OF THE INVENTION

FIG. 1 shows an example of a publication of a module.

A module is a small piece of code providing some functionality. There are no limitations of its size, it can be anything from a file (header file, a class, an xml configuration file) to many files scattered in a directory structure. It is up to the software designer to decide what this module is and which functionality it should provide.

From the IDE's point of view the module is developed inside a nest (see FIG. 2), which is organized as a small project. Beside the code of the module, the code for testing, the design documentation or the manuals can also be stored inside the nest.

The nest provides the possibility to build the module in one or more "presentation forms". The presentation forms are a decision of the software designer and their definition should be consistent across all the modules. Examples of presentation forms are "compiled with debug information", "compiled as release", "with API documentation", and so on.

For each module a responsible person, e.g. project manager, may decide the amount of functionality the module has to provide in a specific version.

The programmer or software developer starts developing the module for achieving the functionality required for the first version. When the desired functionality is achieved the module is published.

Publication means building the module in all the presentation forms and labeling the code in the version control system (see FIG. 2—Version Control System and Code Repository) with a tag corresponding to the current version. The build products are stored in a central repository (see FIG. 2—Publication Repository), to be accessible to all team members.

The first publication of a module, when the functionality of a version is achieved, gets the name "fix 1" ("F1" in FIG. 1) of that version. Here the module is branched in the version control system and later bug fixes take place on this branch, while new functionality is developed on the main trunk. Whenever the project manager decides, usually after one or more bugs were fixed, a new fix (e.g. "F2") of the version is published.

The module in its nest has to access the other modules it depends on in their publicated form. This is why the development environment has to offer access to the publications, be it direct from the central storage or a local cache.

During design and coding, the software designer and the programmer decide which other modules are necessary for this module to compile and execute, and prepare a list of module versions. The development environment has to assure that the nest has access to the last fix of each version of the modules listed as dependencies.

Also, whenever a module is published again (as a new version or as a new fix) all modules depending on it have to be rebuilt. Further a build number to every build of a publication is assigned.

In summary, every publication of a module M has:
version "V"—an identifier for the planned functionality to be achieved;
fix "F" (or fixed version)—an identifier for the quality state, higher fix means more problems solved;
build "B" (or build version)—an identifier for the build, different build numbers for the same fix mean the same code of the module has been built with a different set of dependencies;
presentation form "P" (or presentation version)—an identifier for different build arguments; and/or
a list of the dependencies used when building this publication.

The following conditions should be met:
every new fix F ($F_n$) of a version V has to be backward compatible with the previous fix F ($F_{n-1}$), so if another module depending on this version V of this module can be compiled with the old fix $F_{n-1}$, but it can be compiled also with the new one F.
by design every new version V ($V_n$) of a module has to be either backward compatible with the previous Version V ($V_{n-1}$) or has to be explicitly flagged as "not backward compatible". This way, an automatic build system can decide if it can use the new version $V_n$ for rebuilding modules depending on older versions or not.

This amount of metadata about the modules, their dependencies and publications can be handled reliably with the help of a specialized software tool.

FIG. 2 depicts a system for developing software according to the invention.

The inventive software system for managing the metadata and assisting the development team during the work based on the inventive method comprises
a relational database system 10, for storing the metadata of the development model (instead of a relation database an object-relational or object-oriented database may be used),
a software program acting as server 20, which is adapted for processing client requests and storing its data in the relational database 10,
client side tools 30, which permit accessing the data on the server 20. These can be:
plugins for IDEs 30, so the work with this system is integrated with the rest of the programming tools
stand-alone tools, which are adapted to communicate with the server processor 20.

Further the system may comprise its own automatic build system 40 for performing the publication operations on server side, or it can be integrated with a third-party build system. The built modules may be published with the publication repository 50. Further the source code of the modules may be stored with and managed by the version control system and code repository 60.

Further, a nest 70 is provided. In one embodiment of the invention the nest may be part of the IDE on the client side. In a further embodiment of the invention the nest and their functionality may be provided by a plug-in for the IDE. As described above, the nest manages the module to be developed.

According to the present invention the server may provide the following functionality:
managing the metadata (modules, nests, their dependencies and publications);
controlling the build system for building the publications, either on user request or as a result of the publication of a module they depend on;
determining and/or computing the current actual dependencies of a module, based on different algorithms and on the actual state of the publications; and/or
providing controlled multi-user access.

According to the present invention the client side tools may provide the following functionality:
creating, editing and viewing the metadata,
creating and editing the nests,
performing operations with the version control system to support the usage of the model according to the invention,
copying the needed dependency publications to the nests which need them, as determined and/or computed by the server.

Figure 3:
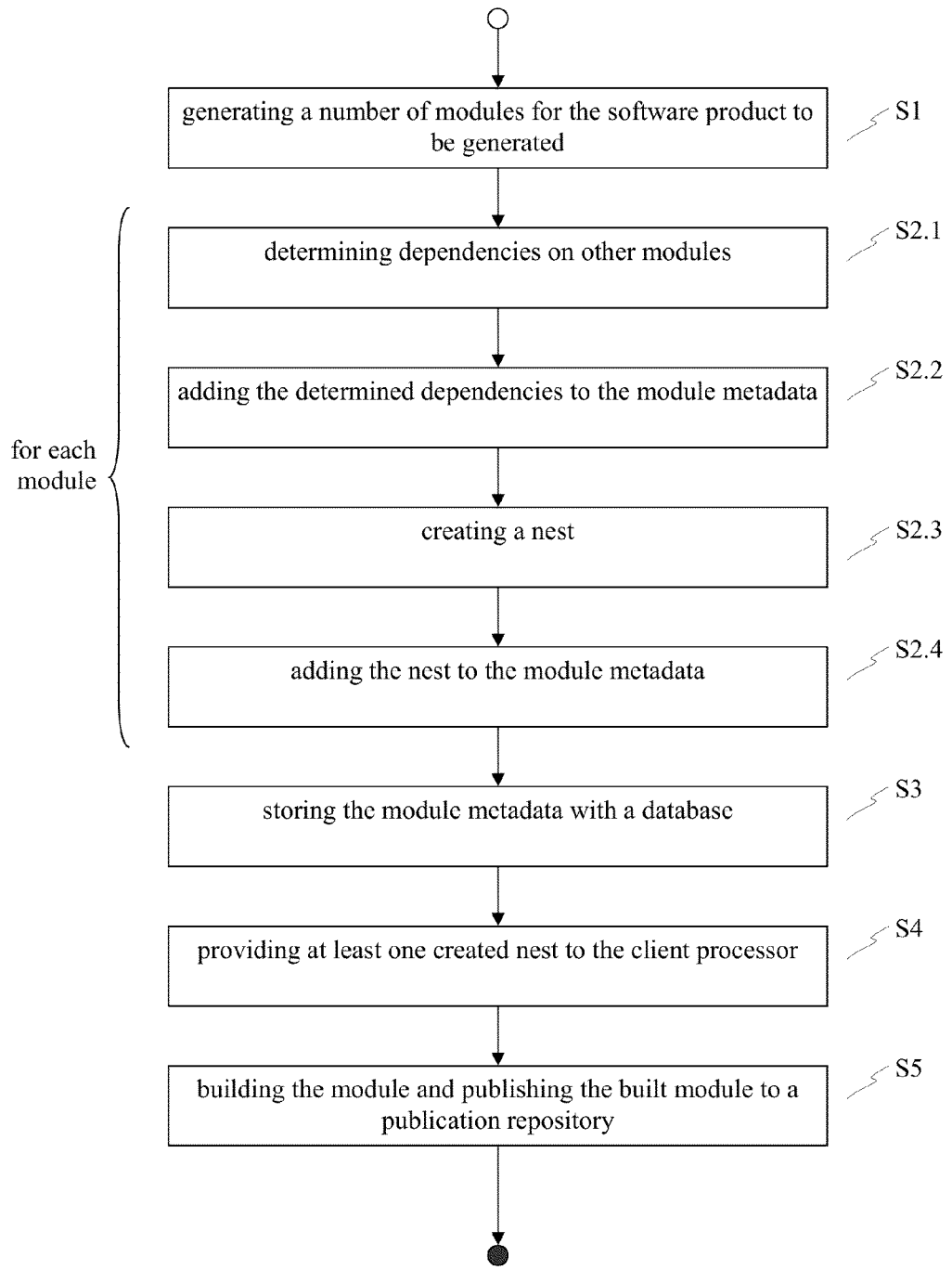

FIG. 3 depicts a flowchart of an embodiment of the inventive method for generating a software product.

According to the invention the software product is split into modules. For each module the functionality and interface is specified. Further, a nest is created for each module and dependencies of each module are added to the module metadata. The module metadata may be stored with the database 10 (see FIG. 2), which is accessible by the server 20.

In one embodiment of the invention the dependencies may be derived from a structured document (XML-document, source code, or any other type of a structured document). In a further embodiment of the invention a design documentation is provided in a structured form (e.g. as a XML document) which allows to derive the dependencies automatically from the design documentation. In yet a further embodiment of the invention the dependencies may be derived from the source code, e.g. by parsing the source code. For example, the server process may search the source code for "#include"-statements.

Thus, in a first step S1 a number of modules for the software product to be generated are generated. This may be done be splitting the software product to be generated into modules. Each module may be described by module metadata.

With the next step S2.1 dependencies on other modules are determined. This is necessary in order to provide the nest with the built modules required for developing a specific module.

In the subsequent step S2.2 the determined dependencies are added to the module metadata of the specific module. The server processor may use the module metadata to control the build process and the publication process.

With the step S2.3 a nest is created which comprises data describing a development environment of a client processor for the specific module.

In the step S2.4 the nest is added to the module metadata. The steps S2.1 to S2.4 are preformed for each generated module.

Further, with the step S3 the module metadata is stored with a database. The database is accessible by the server processor.

With the step S4 at least one created nest is provided to the client processor for being loaded into the development environment of the client processor. More than one nest may be provided to the same client processor, in order to develop a number of modules quasi in parallel on the client processor, i.e. within the client-side IDE.

Within the next step S5 the module is build and the built module is published to a to a publication repository, in order to provide build modules to further nests or further modules of the software product.

It is to be noted that the steps S1 to S5 according to the method as described with reference to FIG. 3 may be performed in another order.

At least one nest is loaded into the work environment, i.e. the development environment. The work environment provides capabilities and resources for implementing the module of the loaded nest. Further, according to the invention more than one nest may be loaded into the work environment. It is recommended that the modules are small enough so that they can be implemented by one or two programmers.

This way the code of the module (e.g. source code, API documentation, design documentation) can be checked-in into the version control repository 60 without influencing the work of other programmers which do not work on these nests.

As soon as the functionality specified for the current version of a module is implemented, the module can undergo an acceptance process. It is to be noted that the acceptance process is an optional process step. If the acceptance process is successful the module may be built and published, i.e. stored with the publication repository 50. It is to be noted once more that the publication repository stores built modules.

Once published, a nest can access other publications (dependencies in FIG. 2, i.e. a nest can access prior versions of the module, prior fixes of a specific version of the module, a specific presentation form of a module or a specific build a specific presentation form). In FIG. 1 a module labeled with "V2F3B2P3" is shown. The label specifies that the module is the module with the Version "V2", the fix version "F2", the presentation form "P3" and the build "B2".

Whenever bugs are fixed in a module, a new fix version is published. The nests may be adapted to update their dependencies and load the new "fixed publications" in their work environment. The server 20 may signal the nest about new versions, new fix versions, new presentation forms, and/or new build versions of the modules. Thus, the nest may update their dependencies and load the new versions of the dependent modules into the nest automatically.

The publication is done by the server 20. The server builds the modules requested by an authorized person (e.g. project manager) and also rebuilds all the modules which depend on them.

This way
the binary compatibility is ensured;
the programmers and/or the nest do not have to store or compile the modules they do not work on,
the programmers load in their environment publications which have passed the acceptance tests, so they will spend less time with the errors in this modules.

Thus, large projects or solutions having hundred of thousands of source files, containing millions of lines of code and needing many GB of storage space can be implemented by a high number of software developers, whereby it is ensured that a developer cannot influence the work of other developers as the dependent modules are provided to the nest of the developer in a build form via the publication repository. Further, there is no need to have a local copy of all the source files in order to compile the module of the nest. Yet further, team members of a project which are not allowed to see and/or access the source code of certain modules will develop only in a controlled environment, the nest of the modules they work on, and the rest of the code is presented to them in compiled form. This way outsourcing without giving access to the entire code is easier. Furthermore, reuse of code or modules in two or more software products which have their own and independent file structure is even more easier as the modules are developed in a controlled environment independently from the software products.

The block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium is tangible, and it can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through 11) intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as are suited to the particular use contemplated.

I claim:

1. A computer-implemented method executed by a server processor for generating a software product comprising:
    generating a number of modules for the software product to be generated, each module being described by module metadata;
    for each generated module
        adding dependencies on other modules to the module metadata;
        creating a nest, the nest comprising data describing a development environment implemented on a client processor for the module;
        adding the nest to the module metadata;
    storing the module metadata with a database operatively connected to the server processor;
    providing at least one created nest to the client processor for being loaded into the development environment implemented on the client processor; and
    building the module and publishing the built module to a publication repository operatively connected to the server processor.

2. The method of claim 1, wherein each module comprises at least source code, the method further comprising storing the source code with a version control repository operatively connected to the server processor.

3. The method of claim 1, further comprising at least one of:
    building a new version of a module and publishing the new version of the module to the publication repository;
    building a new fixed version of a specific version of a module and publishing the new fixed version to the publication repository;
    building a new presentation version of a specific version of a module or a specific fixed version of a module and publishing the new presentation version to the publication repository; or
    building a new build version of a specific version of a module or a specific fixed version of a module and publishing the new build version to the publication repository.

4. The method of claim 3, further comprising signaling the nest loaded into the development environment implemented on the client processor a new version of a module, a new fixed version of a specific version of a module, a new presentation version of a specific version of a module or a specific fixed version of a module, or a new build version of a specific version of a module or a specific fixed version of a module.

5. The method of claim 3, wherein the server processor instructs the nest loaded into the development environment implemented on the client processor to update the dependencies of the module or to load the new versions of the dependent modules into the nest.

6. The method of claim 3, further comprising providing an acceptance process for each module to build.

7. The method of claim 3, wherein the dependencies on other modules are derived from a structured document provided to the server processor.

8. A system for generating a software product comprising:
    a database (10) for storing module metadata describing modules for the software product to be generated;
    a server processor (20) operatively connected to the database (10) and operatively connectable to a client processor (30), the server processor being adapted to perform a method of claim 1 and to provide at least one nest to the client processor for being loaded into a development environment implemented on the client processor, the at least one nest comprising data describing a development environment for a module;
    a publication repository (50) operatively connected to the server processor (20) for storing built modules and for providing built modules to the client processor (30); and
    a version control system (60) operatively connected to the server processor (20) for storing source code of the modules and for providing source code of the modules to the client processor (30).

9. The system of claim 8, further comprising a build system operatively connected to the server processor (20), to the version control system (60) and to the publication repository (50) for generating build modules, publishing the built modules with the publication repository (50) and storing the source code of the modules with the version control system (60).

10. The system of claim 8, the server processor (20) comprises a software program, the software program being adapted for processing requests from the client processor (30).

11. The system of claim 10, the software program further being adapted for providing an interface between the client processor (30), the database (10), the publication repository (50), and the version control system (60).

12. The system of claim 9, the server processor (20) being adapted for controlling the build system (40) for building the publications.

13. The system of claim 8, the server processor (20) being adapted for determining the dependencies of a module for the software product to be generated and for signaling the client processor (30) about a new or changed dependencies.

* * * * *